(12) United States Patent
Hirose (10) Patent No.: US 6,471,424 B1
(45) Date of Patent: Oct. 29, 2002

(54) PRINTER SUITABLE FOR PRINTING ON A SURFACE OTHER THAN A PRINTED SURFACE

(75) Inventor: Takasi Hirose, Tokyo (JP)

(73) Assignee: NEC Corp. (JP)

(*) Notice: Subject to any disclaimer, the term of this patent is extended or adjusted under 35 U.S.C. 154(b) by 0 days.

(21) Appl. No.: 09/521,286

(22) Filed: Mar. 8, 2000

(30) Foreign Application Priority Data

Mar. 8, 1999 (JP) .......................................... 11-060859

(51) Int. Cl.⁷ ................................................ B41J 21/16
(52) U.S. Cl. ....................... 400/282; 400/279; 400/580; 400/583.3; 271/3.02; 271/226; 271/241
(58) Field of Search ........................... 400/61, 81, 188, 400/282, 279, 580, 583.3; 271/3.02, 226, 237, 238, 239, 240, 241

(56) References Cited

U.S. PATENT DOCUMENTS 5,488,458 A * 1/1996 Benedict et al. ............. 399/15
6,029,020 A * 2/2000 Blackman et al. ........... 399/45

FOREIGN PATENT DOCUMENTS

JP          61-272178     * 12/1986     .............. 400/583.3

OTHER PUBLICATIONS

Hp Laser Jet 5L Printer User's Manual, First edition, Oct. 1995, pp. 4–7 and 4–8.*

* cited by examiner

Primary Examiner—Daniel J. Colilla
Assistant Examiner—Minh Chau
(74) Attorney, Agent, or Firm—Dickstein, Shbapiro, Morin & Oshinsky, LLP.

(57) ABSTRACT

A printer is provided, which comprises a printer body 20 including a paper sheet feeding unit for setting paper sheets therein for printing and a paper sheet discharging unit, and a printer controller 10 of the printer body 20. When setting again paper sheets after printing on one surface in the paper sheet feeding unit for printing on the other surface, the printer body 20 is adapted to print, under control of an instruction from the printer controller 10, a first symbol indicating that the paper sheets should be set in the paper sheet feeding unit with the upper, lower, left or right part of the printed surface directed in the paper sheet feed-out direction and also with the printed surface up or down.

12 Claims, 6 Drawing Sheets

PAPER SHEET SETTING POSITION SYMBOL PRINTING SETTING

☐ BACK SURFACE PRINTED

☐ PAPER SHEET SETTING POSITION SYMBOL FOR BACK SURFACE PRINTING

☐ PRINTING ONLY TOP PAPER SHEET IN THE ABOVE CASE

PRINTER SUITABLE FOR PRINTING ON A SURFACE OTHER THAN A PRINTED SURFACE

BACKGROUND OF THE INVENTION

The present invention relates to printers and, more particularly, to printers suitably used for printing on a surface of paper sheets other than a printed surface.

Heretofore, as a double side printing method it has been in practice to use a printer capable of printing on single surface only. In this printing method, printing is first executed on one surface, then the paper sheets are set again in the printer for printing on the other surface, and then printing is executed on the other surface. In this way, the double surface printing is obtained.

In this printing method, when setting paper sheets after printing on one surface in the printer for printing on the other surface, an inconvenience arises due to differences of the paper sheet feed-out route and the printing direction with individual printers. Specifically, it can not be readily judged which of the upper, lower, left and right parts of the printed surface is to be directed in the paper sheet feed-out direction in a paper sheet feeder and whether the paper sheets are to be set with the printed surface up or down in the paper sheet feeder.

Therefore, such inconvenience arises as the possibility of printing again on the printed surface and also the possibility of printing the other surface in the opposite vertical direction to the desired direction.

SUMMARY OF THE INVENTION

The present invention was made in view of the background, and it has an object of solving the above problem by providing a printer, which is hardly subject to such inconvenience, in the case of printing on the blank surface of paper sheets with the other surface thereof having already been printed, of the possibility of printing again on the printed surface and also the possibility of printing the other surface in the opposite vertical direction to the desired direction.

According to an aspect of the present invention, there is provided a printer comprising a printer body capable of single-surface printing and including a paper sheet feeding unit for setting paper sheets therein for printing and a discharging unit for discharging the paper sheets after the printing and a printer controller for controlling the printer, wherein: in the case of printing on the surface of paper sheets other than the surface printed before, the printer body can print, in response to an instruction from the printer controller, a first. symbol, which indicates that the paper sheets have to be set again in the paper sheet feeder, with upper, lower, left or right part directed in the paper sheet feed-out direction, and also with the printed surface up or down.

In the present invention, by the term "the upper, lower, left or right part of one surface" is meant either of these parts of one surface of paper sheet with a document printed thereon when the document is viewed in the right or correct direction. By the term "paper feed-out direction" is meant a direction, in which paper sheet set in a paper sheet feeder is fed out into the printer body.

Desirably, the paper feeder of the printer body is provided with a showing of a second symbol, which indicates, in combination with the first symbol, at least either the upper, lower, left or right part of paper sheet or the front or back surface thereof.

The paper sheet feeding unit of the printer body is provided with a showing of a second symbol indicating, in combination with the first symbol, that the paper sheets have to be set at least either with the upper, lower, left or right part of the sheets is to be directed in the paper sheet feed-out direction or with either surface up or down.

The printer has a function of permitting selection of, when executing printing on a plurality of paper sheets, the printing of the first symbol on the first paper sheet only according to an instruction from the printer controller.

The printer has a function of permitting the selection of printing no first symbol on paper sheet according to an instruction from the printer controller.

The first symbol, when printed by a solid line, indicates setting the paper sheets in the paper sheet feeder with the printed surface up and, when printed by a dashed line, indicates setting the paper sheets in the paper sheet feeder with the printed surface down.

The first symbol and the second symbol are pointed in shape, and the pointed tips are opposite in the slant direction.

Other objects and features will be clarified from the following description with reference to attached drawings.

PREFERRED EMBODIMENTS OF THE INVENTION

Preferred embodiments of the present invention will now be described with reference to the drawings.

First Embodiment

Figure 1:
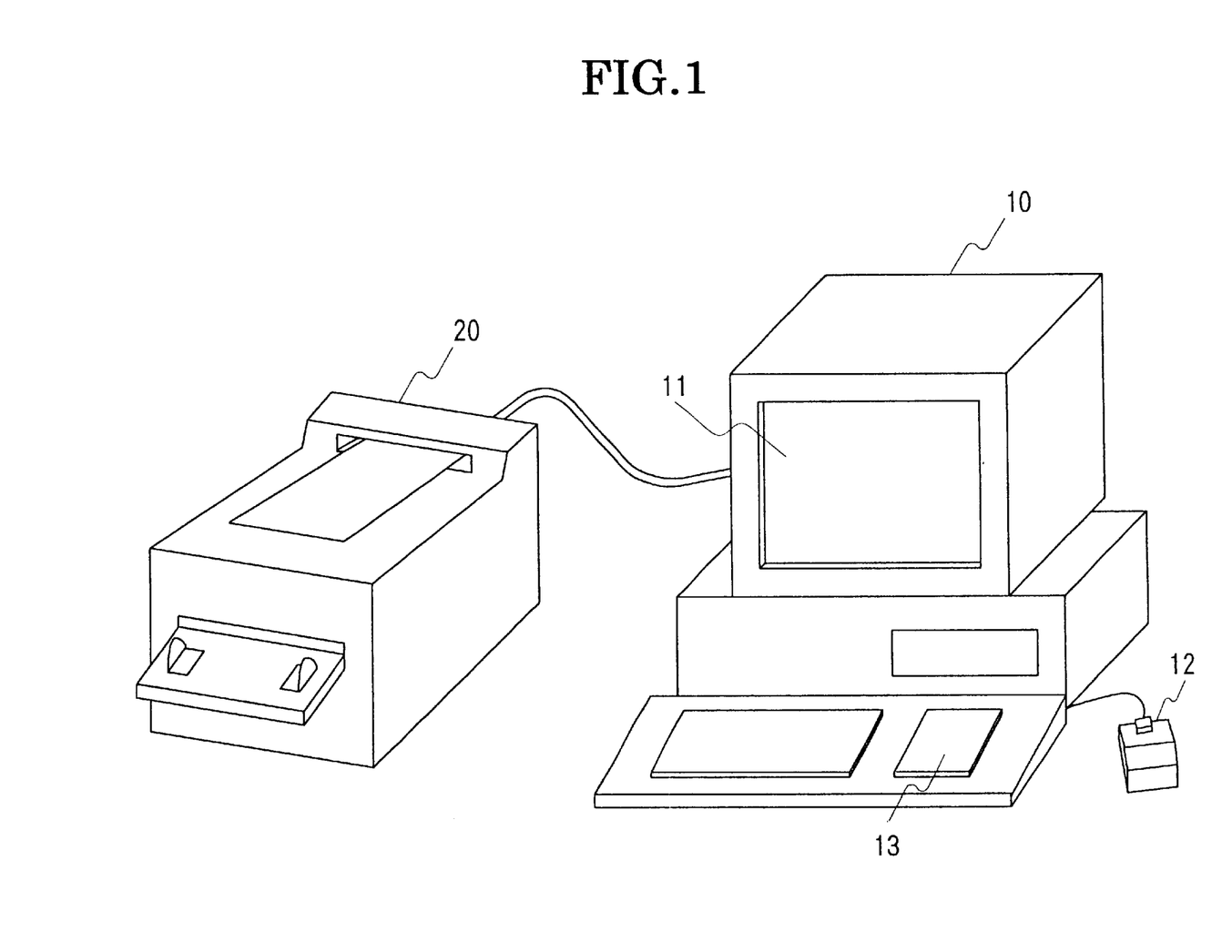
FIG. 1 is a view showing an embodiment of the printer according to the present invention.

FIG. 1 is a view showing an embodiment of the printer according to the present invention. The illustrated printer comprises a printer body 20 capable of printing on single surface alone, and a printer controller 10 connected by a cable to the printer 20.

Figure 2:
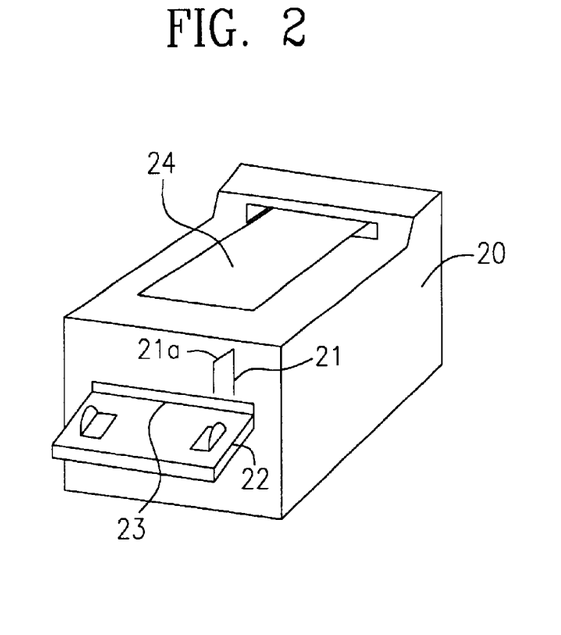
FIG. 2 a view showing the printer body in FIG. 1.
Figure 3:
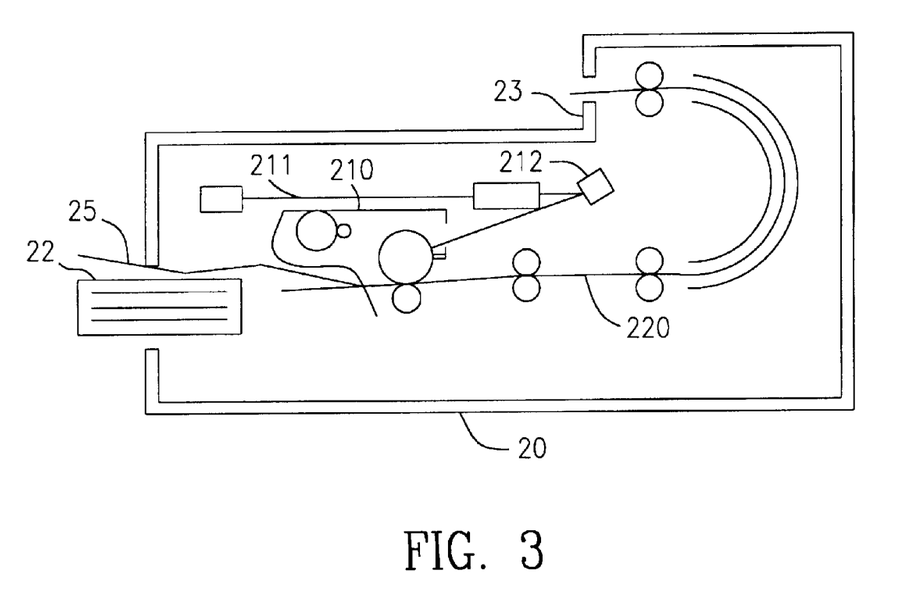
FIG. 3 is simplified sectional view of the printer body in FIG. 2.

As shown in FIGS. 2 and 3, the printer body 20 has a well-known monochromatic laser construction. Referring to FIG. 3 reference numeral 20 designates the printer body, 22 a paper sheet feeding unit, 25 a manual paper sheet feeding unit, 210 an electronic printing unit, 211 a laser beam route, and 212 a reflecting mirror. In this printer body 20, paper sheets for printing are fed along a paper sheet route 220 for printing. As is seen, the printer body 20 is of upper surface printing type, in which the upper surface of paper sheets set in the paper feeder 22 serves as printing surface.

As shown in FIG. 2, the printer body 20 has an impression of a second symbol 21 provided at a right position above the paper sheet feeder 22. The second symbol 21 is pointed in shape, and it is used when setting again paper sheets after printing on one surface in the paper sheet feeding unit 21 for printing on the other surface. Specifically, the second symbol 21 shows the upper, lower, left or right part of the printed surface to be directed in the paper sheet feed-out direction when setting the paper sheets in the paper sheet feeding unit 22, and the direction of the pointed tip 21a of the second symbol 21 indicates the feed-out direction of the paper sheets from the paper sheet feeding unit 22.

The printer body 20 thus operates under control of instructions from the printer controller 10 to feed out paper sheets from the paper sheet feeding unit 22 for printing and discharge the paper sheets after the printing from the discharging unit 24.

The printer controller 10 controls the printer body 20. Referring to FIG. 1, reference numeral 11 designates a display unit including a display, which can provide a display for setting printing conditions such as the number of pages to be printed and the number of paper sheets to be printed. An input unit which is constituted by a mouse 12 and a keyboard 13, instructs the start of printing and printing conditions.

In this printer, the printer body 20 is capable of printing, at the time of the printing and under control of an instruction from the printer controller 10, a first symbol, which indicates, when setting again paper sheets after printing on one surface in the paper sheet feeding unit 22 for printing on the other surface, that either upper, lower, left or right part of the printed surface is to be directed in the paper sheet feed-out direction from the paper sheet feeding unit 22 and also that the paper sheets are to be set in the paper sheet feeding unit 22 with the printed surface either up or down. The printer controller 10 also instructs that the first symbol is to be printed on a marginal area of paper sheet. surface.

Figure 4:
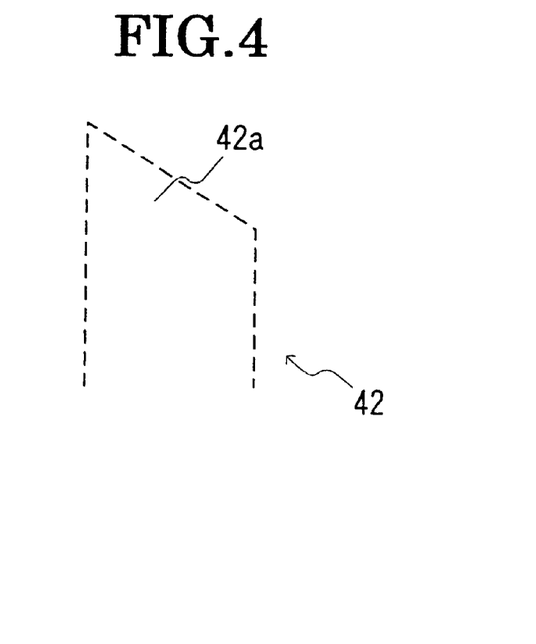
FIG. 4 is a view showing an example of the first symbol.

FIG. 4 is a view showing an example of the first symbol. The first symbol 42, like the second symbol 21. shown on the printer body 20, is pointed in shape, but its pointed tip 42a is opposite in the slant direction. The pointed tip 42a of the first symbol 42 indicates that paper sheets are to be set in the paper sheet feeding unit 22 with the upper, lower, left or right part of the front surface directed in the paper sheet feed-out direction, and the direction of the pointed tip 42a indicates the paper sheet feed-out direction from the paper sheet feeding unit 22 (i.e., upper direction in FIG. 4). The fact that the slant direction of the printed tip 42a is opposite to that of the second symbol 21, indicates that the paper sheets are to be set in the paper sheet feeding unit 22 with the front surface down. By setting the paper sheets with the front surface down, the slant direction of the printed tip 42a of the first symbol 42 and the slant direction of the pointed tip 21a of the second symbol 21 become coincident. As shown in FIG. 4, the first symbol 42 is drawn by a dashed line as a whole. The dashed line indicates that the paper sheets are to be set in the paper sheet feeding unit 22 with the front surface down.

The shape of the first symbol 42 and the drawing of the first symbol 42 by the dashed line, are decided absolutely by the designation, at the time of the printing condition setting, of the model of the printer 20 for actually executing the printing in the pointer controller 10 by the operator.

Figure 5:
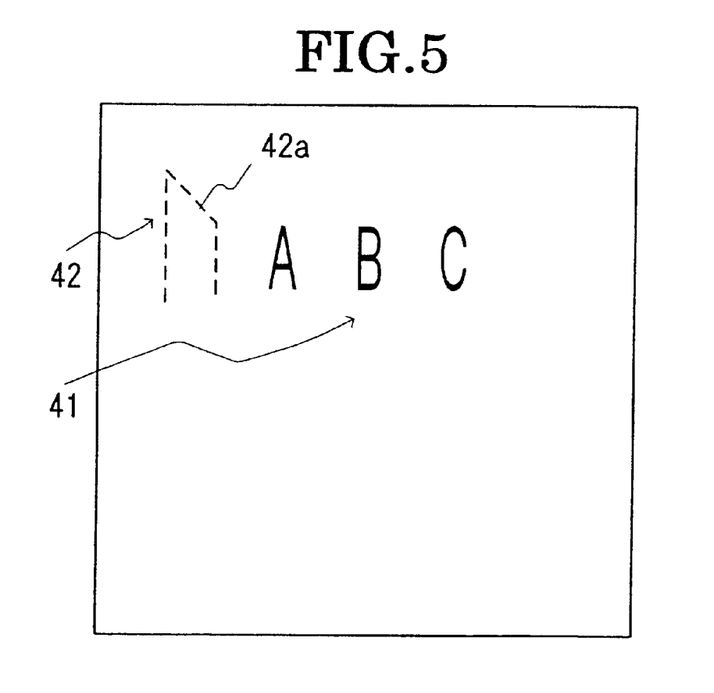
FIG. 5 shows a print on the front surface of the first paper sheet.
Figure 6:
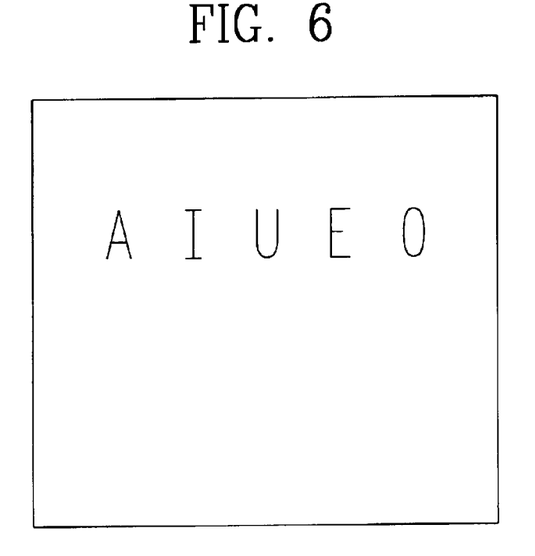
FIG. 6 shows a print on the back surface of the first paper sheets.

Printing using the above printer will now be described. As an example, a case of double surface printing on three paper sheets will be considered. FIG. 5 shows a print on the front surface of the first paper sheet, and FIG. 6 shows a print on the back surface of the first paper sheets.

Figure 7:
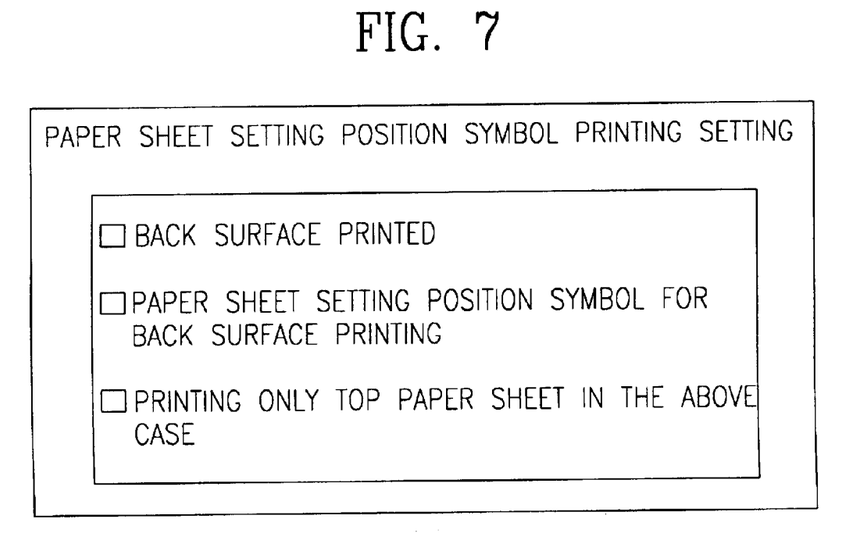
FIG. 7 shows a paper sheet setting position symbol printing setting display.

First, the printing on the front surface, the paper sheets are set in the paper sheet feeding unit 22 in the printer body 20. Then, a display for setting printing conditions is provided on the display unit 11 of the printer controller 10, and the model of the printer body 20 and the printing on three paper sheets are designated by using an input unit. Subsequently, a paper sheet setting position symbol (first symbol) printing setting display as shown in FIG. 7 is provided on the display unit 11. Then, it is designated by using the input unit to effect printing on the back surface, printing a back surface printing paper sheet setting position symbol and printing on only the top (or first) paper sheet. Next, execution of the printing is instructed from the input unit, whereupon the printer controller 10 outputs a printing executing command to the printing body 20.

In response to the command from the printer controller 10, the printer body 20 executes printing by feeding out three paper sheets from the paper sheet feeding unit 22, and discharges these three paper sheets after the printing from the discharging unit 24. In this way, printing on the front surface is obtained. As shown in FIG. 5, letters 41 and first symbol 42 as shown in FIG. 4 are printed on the first paper sheet obtained after the front surface printing, while only the letters 41 are printed on the second and third paper sheets.

The first symbol 42 printed on a margin part of the first paper sheet, is used when setting again the paper sheets after the front surface printing in the paper sheet feeder 22 in the printer body 20.

Figure 8:
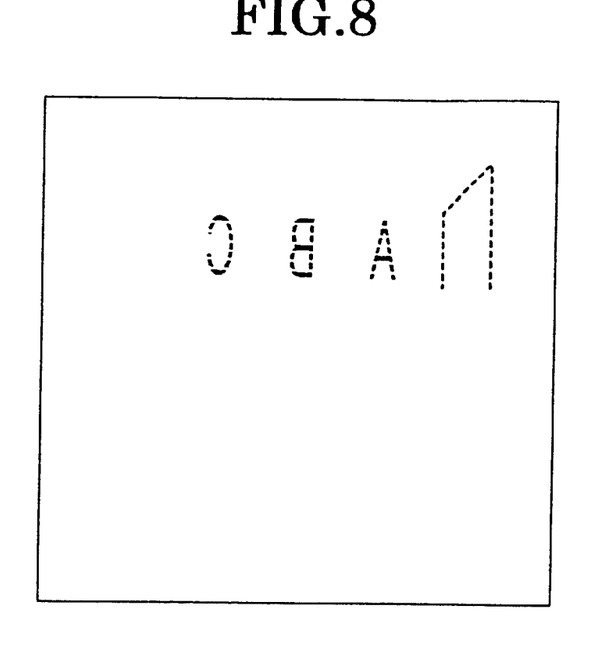
FIG. 8 shows a view of the paper sheet in view point from back.

As shown in FIG. 5, the direction pointed by the pointed tip 42a of the first symbol 42 is an upward direction, and thus indicates that the paper sheets should be set with the upper front surface up and in the paper sheet feed-put direction in the paper sheet feeding unit 22. The pointed tip 42a of the first symbol 42 is slanted oppositely to the second symbol 21 provided on the printer body 20, and thus indicates that the paper sheets should be set with the front surface down and in the paper sheet feed-out direction in the paper sheet feeding unit 22. As shown in FIG. 8, by setting the paper sheet with the front surface down, the slant of the slanted tip 42a of the first symbol 42 coincides with the slant of the slanted tip 21a of the second symbol 21. The first symbol 42 is drawn by a dashed line as a whole, indicating that paper sheets should be set with the front surface down in the paper sheet feeding unit 22.

By noting the slant direction of the pointed tip 42a of the first symbol 42 printed on the first paper sheet and also that the first symbol is drawn by the dashed line, the operator confirms that the paper sheets should be set with the front surface down and with the upper part of the sheets directed in the paper sheet feed-out direction in the paper sheet feeding unit 22. Also, by noting that the slant direction of the pointed tip 42a of the first symbol 42 and the slant direction of the pointed tip 21a of the second symbol 21 provided on the printer body 20 are alike, the operator confirms that the front surface of the paper sheets may be down and also that the upper part of the paper sheets may be directed in the paper sheet feed-out direction from the paper sheet feeding unit 22. In compliance with the above confirmations, the operator sets the paper sheets after the front surface printing in the paper sheet feeding unit 22 of the printer body 20.

Then, like the case of the front surface printing, a printing condition setting display is provided on the display unit 11 of the printer controller 10, and it is instructed by using the input unit to execute printing on three paper sheets. Then, by instructing the execution of the printing from the input unit, the printer controller 10 delivers a command for executing the printing.

In response to the command from the printer controller 10, the printer body 20 executes the printing by feeding out the paper sheets after the front surface printing from the paper sheet feeding unit 22, and discharges the paper sheets after the printing from the discharging unit 24. In this way, the back surface printing as shown in FIG. 5 is obtained.

In this printer, the first symbol that is printed on the front surface of the first paper sheet in the front surface printing, indicates, when setting again the paper sheets after the front surface printing in the paper sheet feeding unit 22 for the back surface printing, that either upper, lower, left or right part of the sheets is to be directed in the paper sheet feed-out direction and also that the paper sheets are to be set with the front surface either up or down. Also, the second symbol provided on the paper sheet feeding unit 22 of the printer body 20, indicates that either upper, lower, left or right part of the paper sheets is to be directed in the paper sheet feed-out direction from the paper sheet feeding unit 22. Thus, it is possible to correctly set paper sheets after the front surface printing in the paper sheet feeding unit 22 for the back surface printing.

Specifically, the operator confirms, by noting the slat direction of the pointed tip 42a of the first symbol 42 printed on the first paper sheet and also that the first symbol is drawn by the dashed line, that the paper sheets should be set with the front surface down and with the upper part of the sheets directed in the paper sheet feed-out direction in the paper sheet feeding unit 22, and also confirms, by noting that the slant direction of the pointed tip 42a of the first symbol 42 and the slant direction of the pointed tip 21a of the second symbol 21 provided on the printer body 20 are alike, that the front surface of the paper sheets may be down and. also that the upper part of the paper sheets may be directed in the paper sheet feed-out direction from the paper sheet feeding unit 22. The operator sets again the paper sheets after the front surface printing in the paper sheet feeding unit 22 of the printer body 20, so that he or she can readily, reliably and correctly set the paper sheets in the paper sheet feeding unit 22 and prevent such erroneous printing operations as printing of the front surface once again or printing on the back surface in the inverted vertical direction from the desired direction.

In addition, with the function permitting the selection of printing of the first symbol 42 on only the first one of, for instance, three paper sheets, it is possible to minimize the number of paper sheets, on which the first symbol 42 which becomes unnecessary after the back surface printing are printed.

Furthermore, with the function permitting the selection of non-printing of the first symbol 42 on any paper sheet by an instruction from the printing controller 10, it is possible to select non-printing of the first symbol 42 in such case as when back surface printing is done, when printing on the front surface once again or printing on the back surface in the inverted vertical direction from the desired direction gives rise to no problem such as when trial printing is executed, when the operator is skilled in the operation of setting paper sheets after the front surface printing in the paper sheet feeding unit 22, or when printing of the first symbol 42 gives rise to an inconvenience.

Second Embodiment

Figure 9:
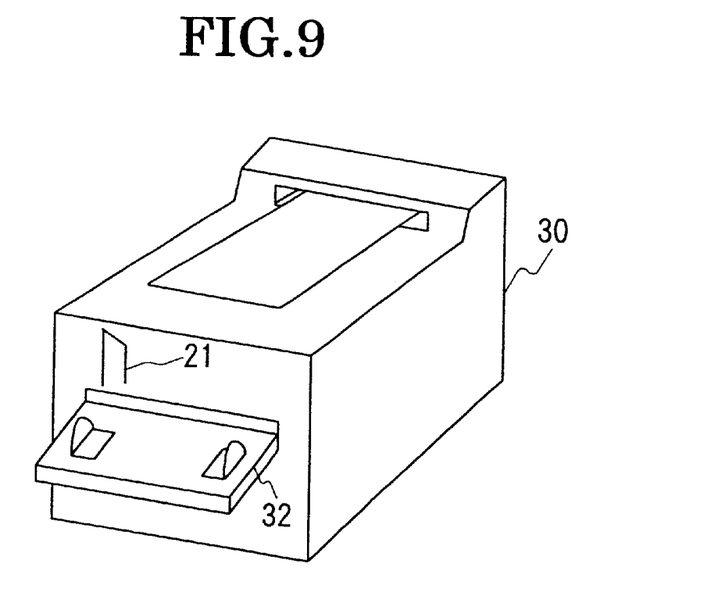
FIG. 9 a view showing the printer body according to another embodiment.

In the printer according to the present invention, as described above, the printer body 20 was of the front surface printing type, in which the upper surface of the paper sheets set in the paper sheet feeding unit 22 constitute the printing surface. However, as shown in FIG. 9, it is as well possible to use a printer body 30 of the lower surface printing type, in which the lower surface of the paper sheets set in the paper sheet feeding unit 32 constitutes the printing surface. This printer body 30, like the printer body 20 shown in FIG. 2, has the second symbol 21, which, in this case, is provided at a right position above the paper sheet feeding unit 32. The printer with the printer body 30 is different from the printer with the printer by 30.

Figure 10:
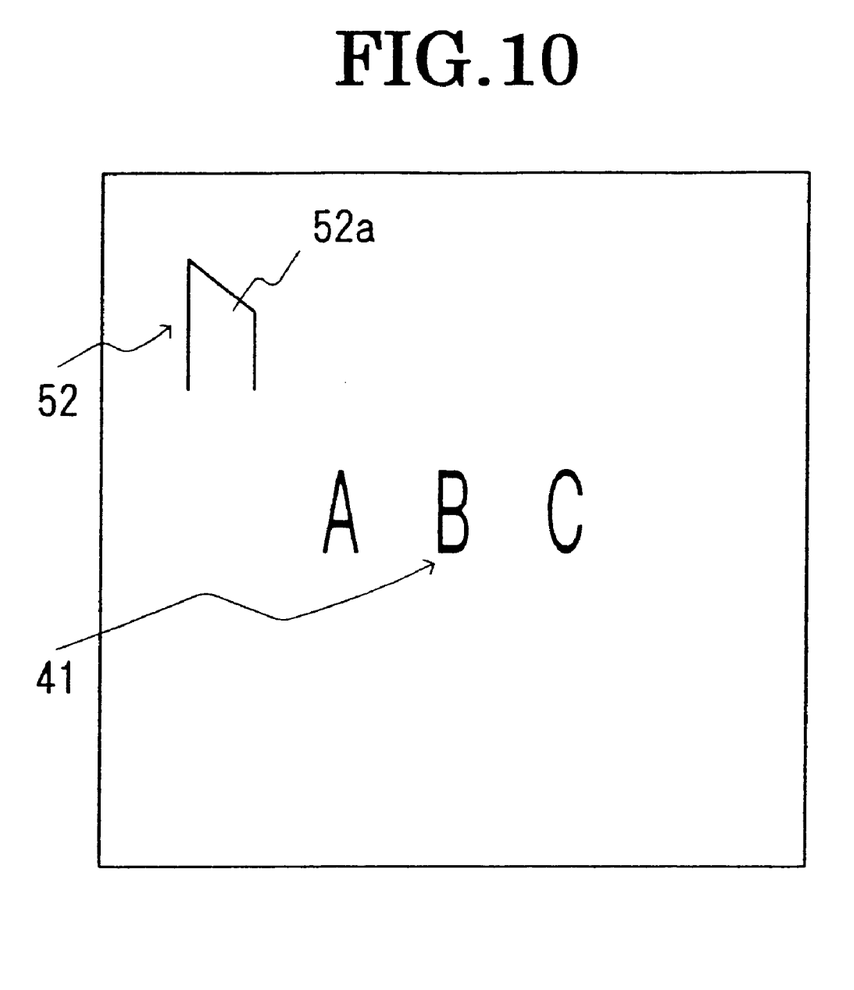
FIG. 10 is a view showing an example of the front surface of a paper sheet after the front surface printing.

FIG. 10 is a view showing an example of the front surface of a paper sheet after the front surface printing. As shown, letters 41 and first symbol 52 are printed.

The first symbol 52, like the second symbol 21 provided on the printer body 30, has a printed tip 52a with the same slant direction. The pointed tip 52a of the first symbol 52 indicates that the paper sheet is to be set in the paper sheet feeding unit 32 with the upper, lower, left or right part of the front surface directed in the paper sheet feed-out direction. As shown in FIG. 10, the first symbol 52 is drawn by as solid line as a whole. The solid line indicates that the paper sheet is to be set with the front surface up in the paper sheet feeding unit 22.

In this printer, the printer body 30 is adapted such that the first symbol 52 is printed in case when printing on the back surface of paper sheet after the front surface printing. Since the second symbol 21 is provided in the paper sheet feeding unit 32 of the printer body, the operator sets again paper sheets after the front surface printing in the paper sheet feeding unit 32 of the printer body 30 after confirming, by noting the slant direction of the printed tip 52a of the first symbol 52 and that the first symbol 52 is drawn by the solid line, the paper sheets should be set with the front surface up and with the upper part of the sheets directed in the paper sheet feed-out direction in the paper sheet feeding unit, and also confirming, by noting that the slant direction of the printed tip 52a of the first symbol 52 and the slant direction of the pointed tip 21a of the second symbol 21 provided on the pointer body 30 are alike, that the paper sheets may be set with the front surface up and with the upper part thereof directed in the paper sheet feed-out direction in the paper sheet feeding unit 22. Thus, it is possible to set the paper sheets in the paper sheet feeder 32 readily, reliably and correctly.

As described above, the printer according to the invention, may use a monochromatic laser printer as the printer bodies 20 and 30, but this is by no means limitative, and it is also possible to use a color laser printer or an ink jet printer.

As described above, the printer according to the invention may be adapted such that the first symbol 42 is printed on a marginal part of paper sheet, but it is also possible to print the symbol on any part other than the marginal part. In the printer according to the invention the first and second symbols 42 and 21 may have a pointed shape, but they may not be of a printed shape. Moreover, a color printer may be used as the printer body, and the first and second symbols may be colored.

In the printer according to the invention in the case of printing on the surface of paper sheets other than the surface printed before, the printer body can print the first symbol, which indicates that the paper sheets have to be set again in the paper sheet feeding unit with the printed surface up or down and with their upper, lower, left and right part directed in the paper sheet feed-out direction. Thus, when printing on the back surface of paper sheets after the front surface printing, the paper sheets can be correctly set in the paper sheet feeding unit.

In addition, the paper sheet feeding unit of the printer body has an impression of the second symbol, which indicates, in combination with the first symbol, that the paper sheets have to be set at least either with the upper, lower, left or right part of the sheets is to be directed in the paper sheet feed-out direction or with either surface up or down. Thus, when printing in the back surface of paper sheets after the front surface printing, the paper sheets can be set correctly in the paper sheet feeding unit. It is thus possible to set the paper sheets reliably and correctly in the paper sheet feeding unit.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A printer apparatus comprising:
    a printing unit structured to print content on print media during a print operation;
    an input unit structured to receive the print media and to deliver the print media to the printing unit in one of a plurality of orientations; and
    a controller structured to receive information concerning the print media, and to instruct the printing unit during a first print operation to print a first symbol and the content on the print media, wherein the first symbol indicates the orientation in which the print media should be set in the input unit during a subsequent print operation on the print media.

2. The printer apparatus of claim 1, further comprising a second symbol located on the input unit corresponding with the first symbol indicating the orientation in which the print media should be set in the input unit.

3. The printer apparatus of claim 1, wherein the first symbol is not printed on the print media as a function of the instructions from the controller.

4. The printer apparatus of claim 1, wherein printing of the first symbol is restricted to one of a plurality of the print media as a function of the instructions from the controller.

5. The printer apparatus of claim 1, wherein the first symbol is formed in one of a plurality of line styles indicating the orientation in which the print media should be set in the input unit during subsequent print operations on the print media.

6. The printer apparatus of claim 5, wherein the one of a plurality of line styles corresponds with the shape of the first symbol.

7. A method for indicating how to orient print media in an input unit of a printer apparatus, the method comprising:
    submitting information concerning the print media in a controller;
    printing a first symbol on the print media in a first print operation as a function of instructions received from the controller,
    wherein the first symbol printed on the print media identifies the orientation in which the print media should be set in the input unit during a subsequent print operation.

8. The method of claim 7, further comprising providing a second symbol on the input unit corresponding with the first symbol.

9. The method of claim 7, further comprising restricting printing of the first symbol on the print media as a function of the instructions from the controller.

10. The method of claim 7, further comprising restricting printing of the first symbol on one of a plurality of the print media as a function of the instructions from the controller.

11. The method of claim 7, further comprising forming the first symbol in one of a plurality of line styles indicating the orientation in which the print media should be set in the input unit during a subsequent print operation on the print media.

12. The method of claim 11, wherein the one of a plurality of line styles corresponds with the shape of the first symbol.

* * * * *